(12) United States Patent
Tamura et al.

(10) Patent No.: US 12,097,743 B2
(45) Date of Patent: Sep. 24, 2024

(54) SUSPENSION STRUCTURE FOR VEHICLE AND METHOD OF MANUFACTURING THE SAME

(71) Applicant: YOROZU CORPORATION, Yokohama (JP)

(72) Inventors: Shinji Tamura, Yokohama (JP); Takuto Takase, Yokohama (JP); Kengo Andou, Yokohama (JP)

(73) Assignee: YOROZU CORPORATION, Yokohama (JP)

( * ) Notice: Subject to any disclaimer, the term of this patent is extended or adjusted under 35 U.S.C. 154(b) by 0 days.

(21) Appl. No.: 18/044,570

(22) PCT Filed: Sep. 29, 2020

(86) PCT No.: PCT/JP2020/036862
§ 371 (c)(1),
(2) Date: Mar. 8, 2023

(87) PCT Pub. No.: WO2022/070248
PCT Pub. Date: Apr. 7, 2022

(65) Prior Publication Data
US 2024/0025221 A1 Jan. 25, 2024

(51) Int. Cl.
*B60G 7/00* (2006.01)

(52) U.S. Cl.
CPC ........ *B60G 7/001* (2013.01); *B60G 2206/122* (2013.01); *B60G 2206/8102* (2013.01);
(Continued)

(58) Field of Classification Search
CPC ...... B60G 2206/8102; B60G 2206/122; B60G 7/001
See application file for complete search history.

(56) References Cited

U.S. PATENT DOCUMENTS

| 7,575,244 B2* | 8/2009 | Howell | B60G 7/001 |
| | | | 280/124.134 |
| 7,703,783 B2* | 4/2010 | Miyawaki | B60G 7/02 |
| | | | 280/124.134 |

(Continued)

FOREIGN PATENT DOCUMENTS

| CN | 110497755 A | | 11/2019 |
| CN | 114919356 A | * | 8/2022 |

(Continued)

OTHER PUBLICATIONS

JP 2015231780 A machine translation from espacenet.com (Year: 2024).*

(Continued)

*Primary Examiner* — Amy R Weisberg
*Assistant Examiner* — Maxwell L Meshaka
(74) *Attorney, Agent, or Firm* — Lucas & Mercanti, LLP

(57) ABSTRACT

A suspension structure for vehicle (a suspension arm for vehicle) is formed of a first plate and a second plate, and includes a mounting part for mounting a component (a collar or a bush). The first plate is partially open toward a first flat plate part so that a first mounting surface can be formed by stamping in a state of a single unit where a first flat plate part is bent. The second plate is also partially open toward a second flat plate part. The mounting part is configured by facing the first flat plate part of the first plate and the second flat plate part of the second plate each other at a distance, and disposing the first mounting surface and a second mounting surface at a distance.

11 Claims, 11 Drawing Sheets

(52) U.S. Cl.
CPC ............... *B60G 2206/8103* (2013.01); *B60G 2206/8201* (2013.01); *B60G 2206/82092* (2013.01)

(56) References Cited

U.S. PATENT DOCUMENTS

| | | | | |
|---|---|---|---|---|
| 8,690,176 | B2* | 4/2014 | Perry | B21D 53/88 |
| | | | | 280/124.134 |
| 9,789,532 | B2* | 10/2017 | Di Serio | B60G 7/001 |
| 10,202,012 | B2* | 2/2019 | Narita | B21D 53/88 |
| 10,343,204 | B2* | 7/2019 | Narita | B60G 7/001 |
| 10,974,559 | B2* | 4/2021 | Mainz | B29C 70/081 |
| 11,230,151 | B2* | 1/2022 | Fortmeier | B60G 7/001 |
| 11,821,459 | B2* | 11/2023 | Kester | B60G 7/005 |
| 2005/0104315 | A1* | 5/2005 | Howell | B60G 7/001 |
| | | | | 280/124.134 |
| 2009/0102153 | A1* | 4/2009 | Jung | B60G 7/001 |
| | | | | 280/124.15 |
| 2010/0066050 | A1* | 3/2010 | Miyawaki | B60G 7/02 |
| | | | | 29/525 |
| 2011/0285102 | A1 | 11/2011 | Yu et al. | |
| 2016/0107494 | A1* | 4/2016 | Narita | B21D 53/88 |
| | | | | 280/124.134 |
| 2016/0136713 | A1* | 5/2016 | Narita | B21D 5/01 |
| | | | | 428/603 |
| 2019/0248200 | A1* | 8/2019 | Mainz | B29C 70/081 |
| 2020/0247204 | A1* | 8/2020 | Fortmeier | B60G 7/001 |
| 2022/0220595 | A1* | 7/2022 | Otsuka | B23K 9/0026 |
| 2023/0264533 | A1* | 8/2023 | Abram | B60G 7/001 |
| 2023/0332639 | A1* | 10/2023 | Kester | B60G 7/005 |

FOREIGN PATENT DOCUMENTS

| | | | | |
|---|---|---|---|---|
| EP | 2987665 | A1 * | 2/2016 | ............ B21D 53/88 |
| EP | 3539802 | A1 * | 9/2019 | ............ B60G 7/001 |
| FR | 3041569 | A1 * | 3/2017 | |
| JP | 2005-104317 | A | 4/2005 | |
| JP | 2010-111225 | A | 5/2010 | |
| JP | 2013-066923 | A | 4/2013 | |
| JP | 2014-004939 | A | 1/2014 | |
| JP | 2015-231780 | A | 12/2015 | |
| JP | 2016-055716 | A | 4/2016 | |
| JP | 2016-172470 | A | 9/2016 | |
| WO | WO-2014147834 | A1 * | 9/2014 | ............ B60G 7/001 |
| WO | WO-2017064404 | A1 * | 4/2017 | ............ B60G 7/001 |
| WO | 2017/126718 | A1 | 7/2017 | |

OTHER PUBLICATIONS

JP 2014004939 A machine translation from espacenet.com (Year: 2024).*
WO 2014147834 A1 machine translation from FIT (Year: 2024).*
International Search Report dated Dec. 8, 2020 for the corresponding patent application No. PCT/JP2020/036862, with English translation.
Extended European Search Report dated Oct. 10, 2023 for the corresponding European patent application No. 20956178.6.
Japanese Patent Office, Notice of Reasons for Refusal mailed on Mar. 5, 2024, which was issued for related Japanese Patent Application No. 2022-553254 with full English translation, 10 pages.
Japanese Patent Office, Notice of Reasons for Refusal mailed on Jul. 23, 2024, which was issued for related Japanese Patent Application No. 2022-553254 with full English translation, 10 pages.

* cited by examiner

SUSPENSION STRUCTURE FOR VEHICLE AND METHOD OF MANUFACTURING THE SAME

CROSS REFERENCE TO RELATED APPLICATION

This Application is a 371 of PCT/JP2020/036862 filed on Sep. 29, 2020 which is incorporated herein by reference.

TECHNICAL FIELD

The present invention relates to a suspension structure for vehicle and a method of manufacturing the same.

BACKGROUND ART

The vehicle suspension device includes a large number of components such as a suspension structure for vehicle and a shock absorber. As the suspension structure for vehicle, there are, for example, a suspension arm for vehicle and a suspension member for vehicle. The suspension structure for vehicle includes a mounting part for mounting a component for vehicle suspension.

As a suspension arm for vehicle to be attached to a front portion of a vehicle, for example, a lower arm having a shape close to an L-shape in a plan view is known (see Patent Literatures 1 and 2). This lower arm includes a mounting part to which a collar is attached by welding at a middle portion. The collar is a component for vehicle suspension, and swingably couples the lower arm with the vehicle body. The mounting part is formed by a pair of wall portions. The mounting part is formed by forming a recessed arc-shaped collar mating surface corresponding to the shape of the outer peripheral surface of the collar on a plate material and then bending the plate material. The cross-sectional shape in the vicinity of the mounting part has a cup shape (shape close to a U shape) formed by the pair of wall portions and a top plate portion connecting the pair of wall portions.

CITATION LIST

Patent Literatures

Patent Literature 1: JP 2016-55716 A
Patent Literature 2: JP 2016-172470 A

SUMMARY OF INVENTION

Technical Problem

It is relatively difficult to form the mounting part with high accuracy by bending, and there is a risk that the axis of the collar attached to the mounting part deviates from the designed axis (e.g., the front-back direction of the vehicle body).

In order to form the mounting part with high accuracy, the following method is generally adopted. First, a plate material is bent. Thereafter, a tooling die is inserted between the pair of wall portions included in the mounting part. Subsequently, a part of the wall portion is trimmed and cut by stamping to form a recessed arc-shaped collar mating surface of a shape corresponding to the shape of the outer peripheral surface of the collar.

However, in a case where the axial length of the collar is short due to restrictions such as a vehicle body layout, the dimension between the pair of wall portions included in the mounting part becomes small. In such a case, a tooling die having a width capable of securing strength capable of withstanding a load at the time of trim cutting cannot be inserted between the pair of wall portions. For this reason, in place of stamping, a laser cutting apparatus or the like is needed to be used to form the collar mating surface and the manufacturing cost increases.

Therefore, the present invention aims to provide: a suspension structure for vehicle where a mounting part for mounting a component is formed by applying stamping advantageous in terms of cost, even in a case where the axial length of the component such as a collar is short; and a method of manufacturing the same.

Solution to Problem

One aspect of the present invention is a suspension structure for vehicle including: a main body formed of at least a first plate and a second plate which are stamped products, and including at least a portion whose cross section has a rectangular shape; and a mounting part for mounting a component for vehicle suspension. The first plate includes: a first main body included in the main body; a first flat plate part extending in continuity with a main surface of the first main body and being bent with respect to the main surface; and a first mounting surface formed on the first flat plate part and to abut on an outer surface of the component. The second plate includes: a second main body, which is together with the first main body of the first plate included in the main body; a second flat plate part extending in continuity with a main surface of the second main body and being bent with respect to the main surface; and a second mounting surface formed on the second flat plate part and to abut on the outer surface of the component. The first plate is partly open toward the first flat plate part so that the first mounting surface can be formed by stamping in a state of a single unit where the first flat plate part is bent. The second plate is partly open toward the second flat plate part so that the second mounting surface can be formed by stamping in a state of a single unit where the second flat plate part is bent. The main body is configured by making the first main body of the first plate and the second main body of the second plate to face each other. The mounting part is configured by making the first flat plate part of the first plate and the second flat plate part of the second plate to face each other at a distance, and disposing the first mounting surface and the second mounting surface at a distance.

Another aspect of the present invention is a method of manufacturing a suspension structure for vehicle including: a main body formed of at least a first plate and a second plate which are stamped products and including at least a portion whose cross section has a rectangular shape; and a mounting part for mounting a component for vehicle suspension. On the first plate, there are formed a first main body included in the main body and a first flat plate part extending in continuity with a main surface of the first main body and being bent with respect to the main surface. The first plate where the first flat plate part is bent is made to abut on a die and stamped, whereby a first mounting surface to abut on an outer surface of the component is formed on the first flat plate part. On the second plate, there are formed a second main body, which is together with the first main body of the first plate included in the main body, and a second flat plate part extending in continuity with a main surface of the second main body and being bent with respect to the main surface. The second plate where the second flat plate part is bent is made to abut on the die and stamped, whereby a second mounting surface to abut on the outer surface of the component is formed on the second flat plate part. The first main body of the first plate and the second main body of the second plate are brought into a state of facing each other, furthermore, the first flat plate part of the first plate and the second flat plate part of the second plate are made to face each other at a distance, and in a state where the first mounting surface and the second mounting surface are disposed at a distance, the first plate and the second plate are combined by welding joint to form the main body and the mounting part.

Advantageous Effects of Invention

According to the present invention, there can be provided: a suspension structure for vehicle where a mounting part for mounting a component is formed by applying stamping advantageous in terms of cost even in a case where the axial length of the component such as a collar is short; and a method of manufacturing the same.

DESCRIPTION OF EMBODIMENTS

Hereinafter, embodiments of the present invention will be described in detail with reference to the drawings. The embodiments shown herein are examples in order to embody the technical idea of the present invention, and do not limit the present invention. Therefore, other embodiments, examples, operation techniques, and the like that can be conceived and implemented by those skilled in the art and the like without departing from the gist of the present invention are all included in the scope and gist of the present invention and included in the invention described in the claims and the scope of equivalents thereof.

In addition, the drawings attached to the present specification, which may be schematically represented by appropriately modifying a scale, an aspect ratio, a shape, and the like from actual ones for convenience of illustration and ease of understanding, are merely an example, and do not limit the interpretation of the present invention.

Note that, in the present specification, there may be a case where ordinal numbers such as "first" and "second" and the like are added. However, unless there is a particular description regarding these ordinal numbers, the ordinal numbers are given for the sake of convenience of description to identify the components, and do not specify the number or order.

The vehicle suspension device includes a large number of component articles such as a suspension structure for vehicle and a shock absorber. As the suspension structure for vehicle, there are, for example, a suspension arm for vehicle and a suspension member for vehicle. The suspension structure for vehicle according to the present invention includes: a main body formed of at least a first plate and a second plate which are stamped products, and having at least a portion whose cross section has a rectangular shape; and a mounting part for mounting a component for vehicle suspension. As the suspension structure for vehicle, there are, for example, a suspension arm for vehicle and a suspension member for vehicle. Hereinafter, there will be described an embodiment in which the suspension structure for vehicle according to the present invention is applied to a suspension arm for vehicle.

First Embodiment

Figure 1:
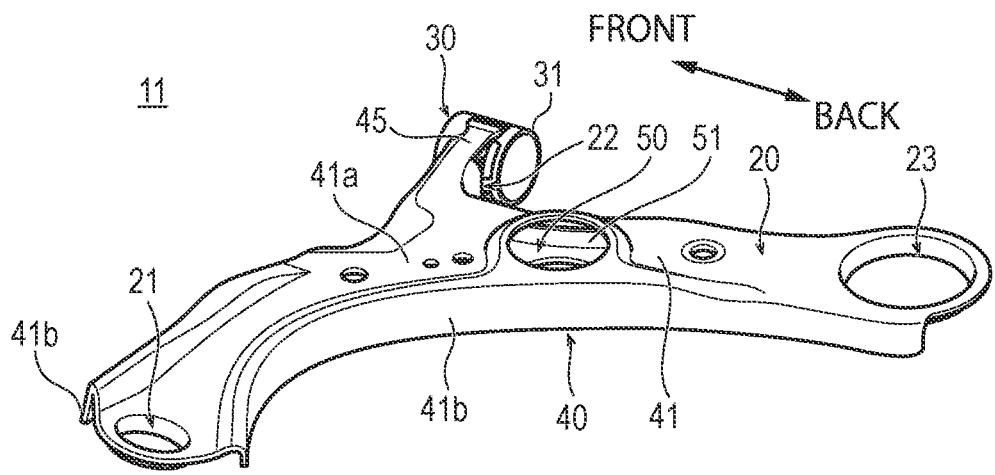
FIG. 1 is a perspective view illustrating a suspension arm for vehicle as a suspension structure for vehicle of a first embodiment.
Figure 2:
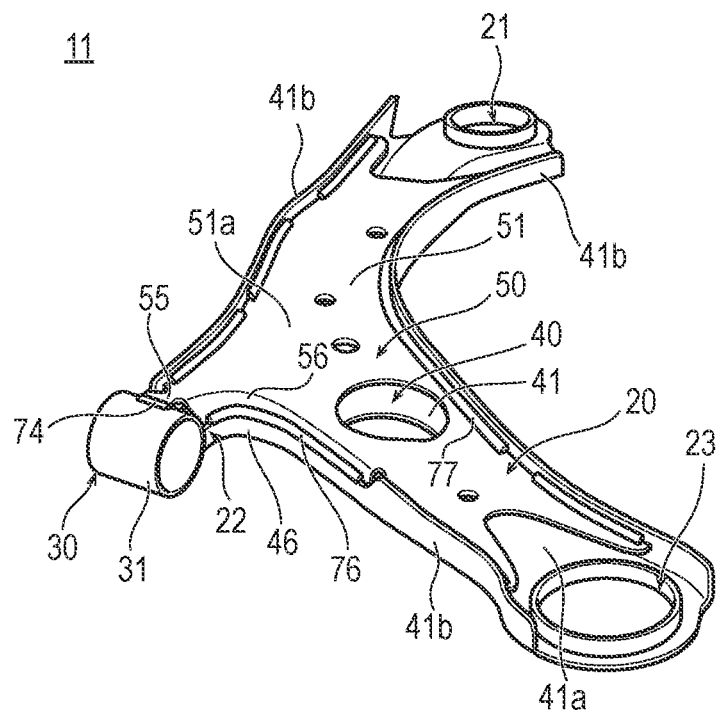
FIG. 2 is a perspective view illustrating the suspension arm for vehicle in FIG. 1 by reversing the front and the back surfaces.
Figure 3:
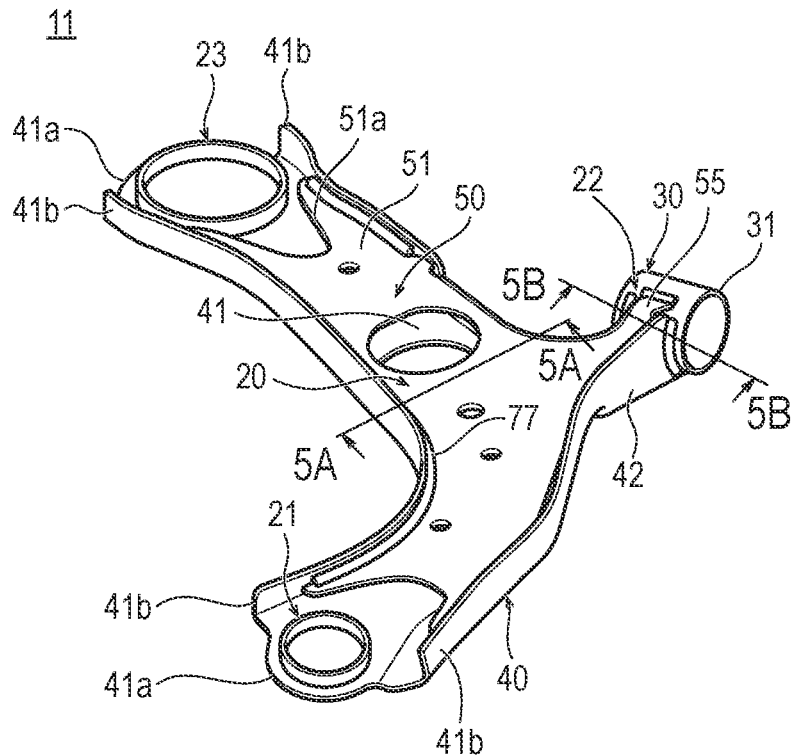
FIG. 3 is a perspective view illustrating the suspension arm for vehicle as viewed from a direction different from the direction in FIG. 2.
Figure 4:
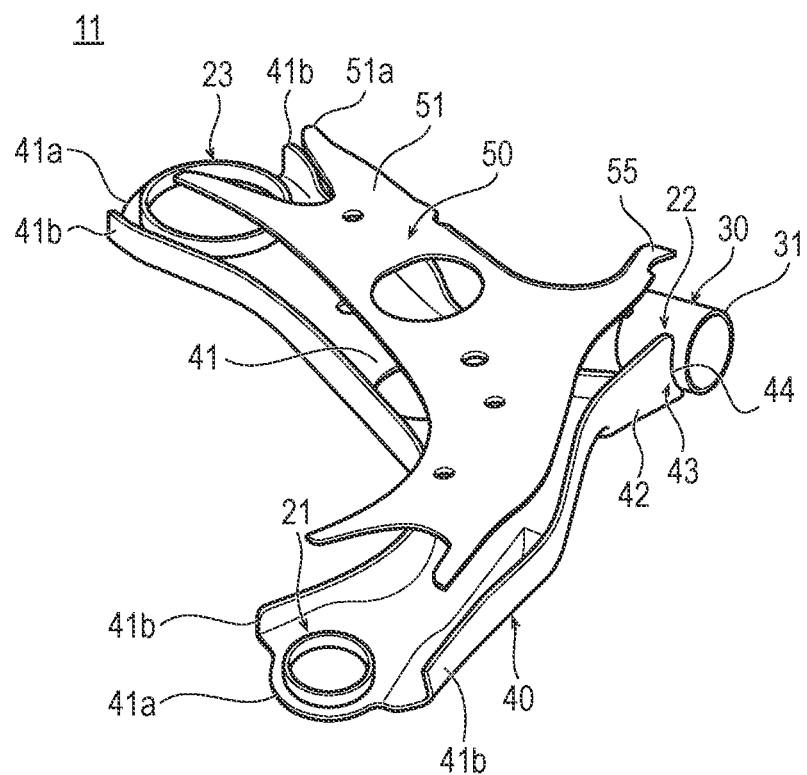
FIG. 4 is a perspective view illustrating the suspension arm for vehicle illustrated in FIG. 3 in a state where the first plate and the second plate are spaced apart from each other.
Figure 5A:
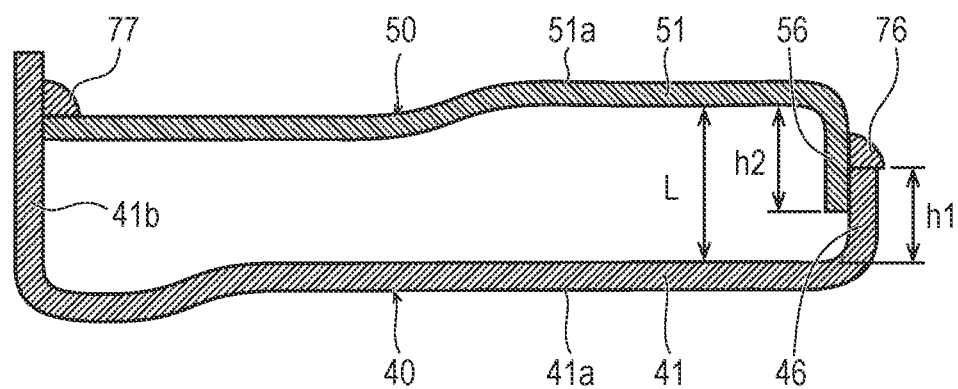
FIG. 5A is a cross-sectional view taken along line 5A-5A in FIG. 3.
Figure 5B:
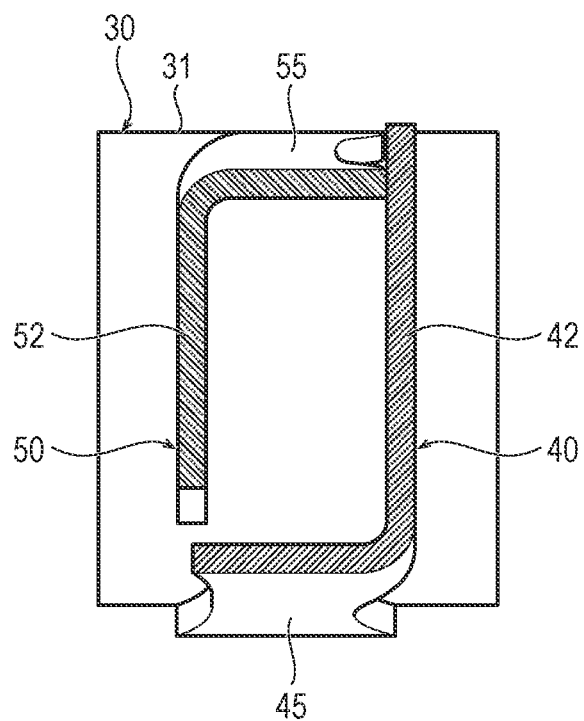
FIG. 5B is a cross-sectional view taken along line 5B-5B in FIG. 3.
Figure 6:
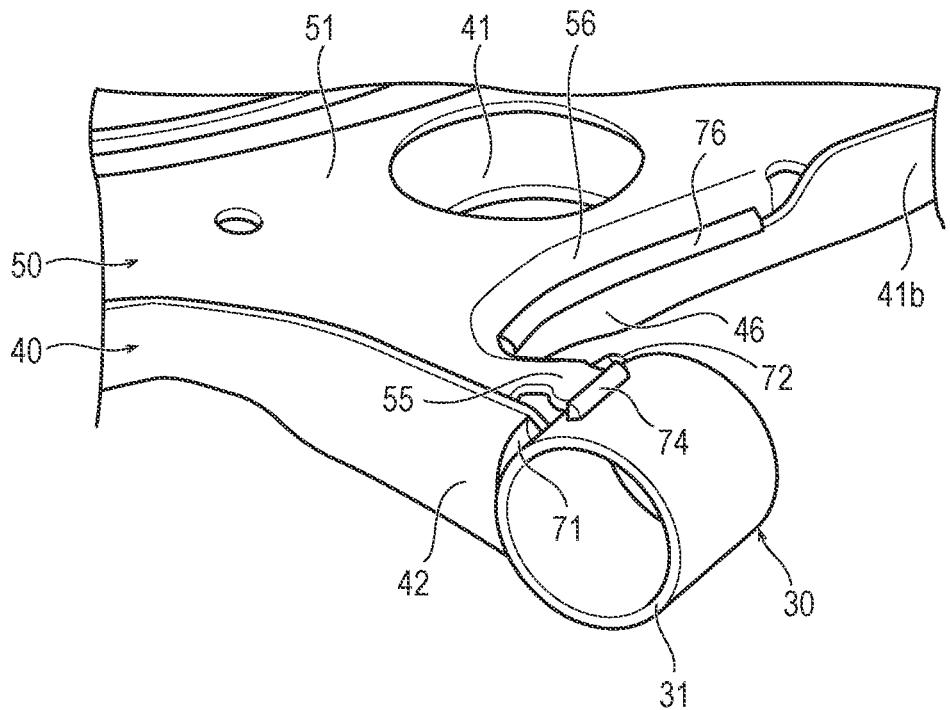
FIG. 6 is a perspective view illustrating the vicinity of a mounting part of a suspension arm for vehicle and a collar as a component as viewed from the front of the vehicle.
Figure 7:
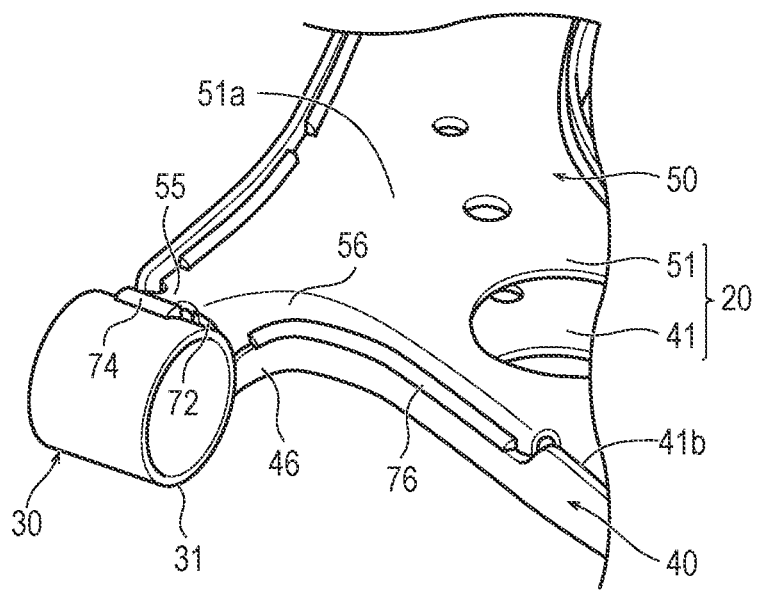
FIG. 7 is a perspective view illustrating the vicinity of a mounting part of a suspension arm for vehicle and a collar as a component as viewed from the behind of the vehicle.
Figure 8:
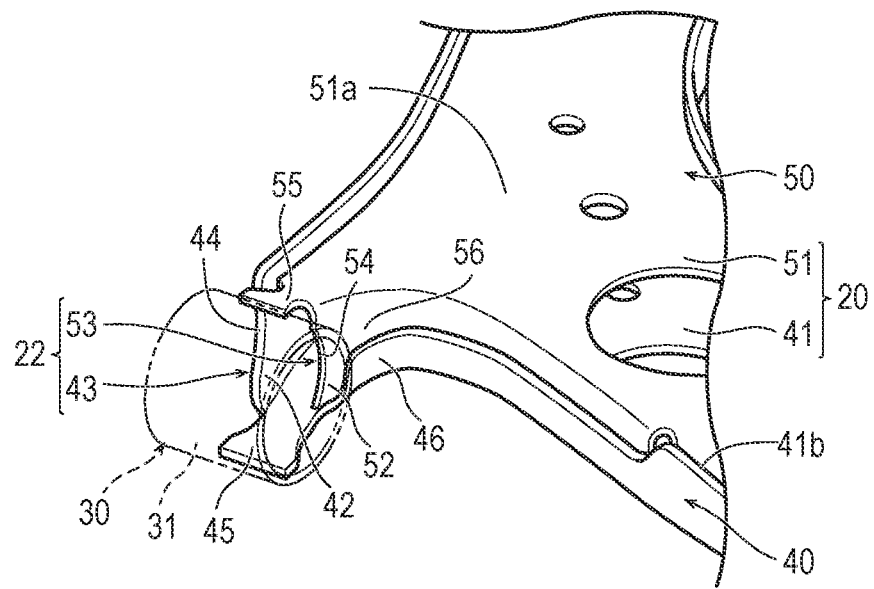
FIG. 8 is a perspective view illustrating the vicinity of a mounting part of a suspension arm for vehicle as viewed from the behind of the vehicle.
Figure 9:
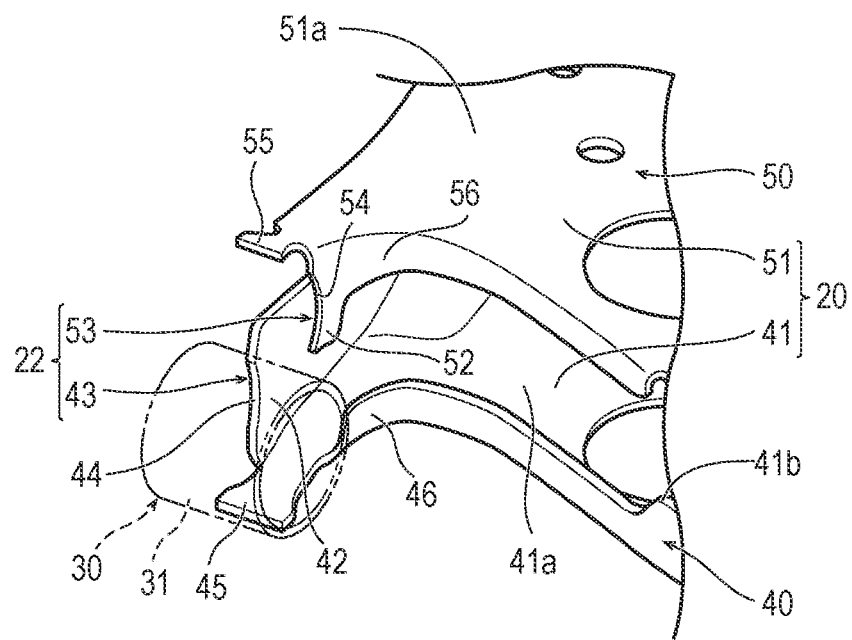
FIG. 9 is a perspective view illustrating the vicinity of the mounting part of the suspension arm for vehicle illustrated in FIG. 8 in a state where the first plate and the second plate are spaced apart from each other.
Figure 10:
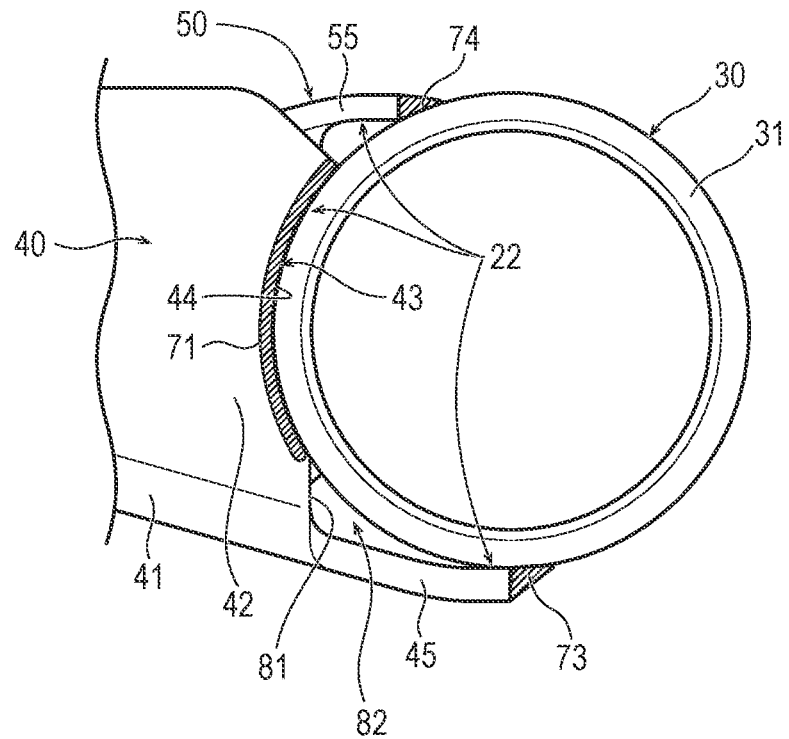
FIG. 10 is a side view illustrating the vicinity of the mounting part of the suspension arm for vehicle and the collar as a component of the aspect of FIG. 2 as viewed from the front of the vehicle.
Figure 11:
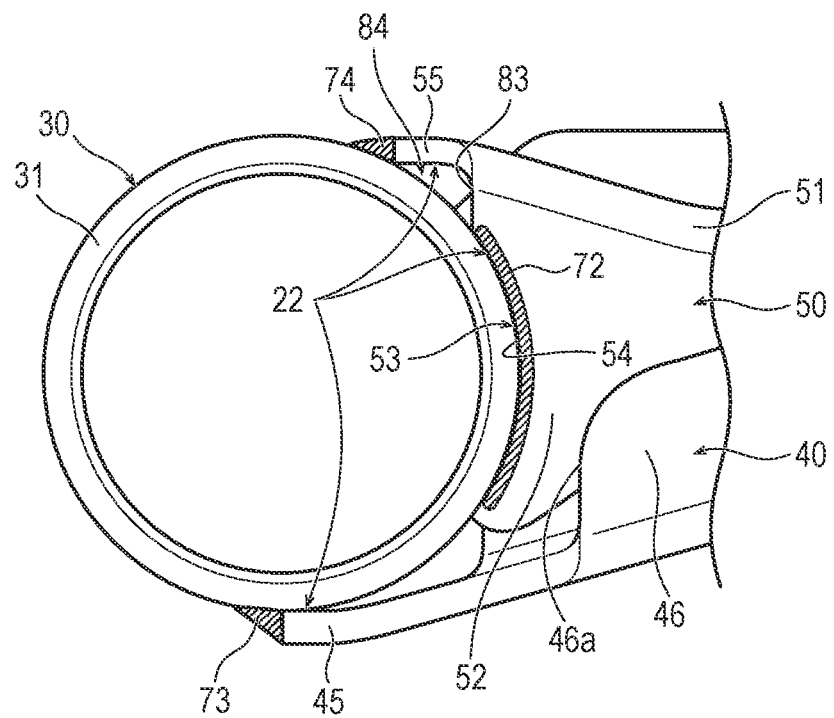
FIG. 11 is a side view illustrating the vicinity of the mounting part of the suspension arm for vehicle and the collar as a component of the aspect of FIG. 2 as viewed from the behind of the vehicle.

A suspension arm 11 for vehicle of a first embodiment will be described with reference to FIGS. 1 to 14. FIG. 1 is a perspective view illustrating a suspension arm 11 for vehicle of a first embodiment, FIG. 2 is a perspective view illustrating the suspension arm 11 for vehicle in FIG. 1 by reversing the front and back surfaces, FIG. 3 is a perspective view illustrating the suspension arm 11 for vehicle as viewed from a direction different from the direction in FIG. 2, and FIG. 4 is a perspective view illustrating the suspension arm 11 for vehicle illustrated in FIG. 3 in a state where the first plate 40 and the second plate 50 are spaced apart from each other. FIG. 5A is a cross-sectional view taken along line 5A-5A in FIG. 3, and FIG. 5B is a cross-sectional view taken along line 5B-5B in FIG. 3. FIGS. 6 and 7 are a perspective view illustrating the vicinity of the mounting part 22 of the suspension arm 11 for vehicle and the collar 31 as the component 30 as viewed from the front of the vehicle and a perspective view illustrating them as viewed from the behind of the vehicle, respectively. FIG. 8 is a perspective view illustrating the vicinity of the mounting part 22 of the suspension arm 11 for vehicle as viewed from the behind of the vehicle, and FIG. 9 is a perspective view illustrating the vicinity of the mounting part 22 of the suspension arm 11 for vehicle illustrated in FIG. 8 in a state where the first plate 40 and the second plate 50 are spaced apart from each other. FIGS. 10 and 11 are a side view illustrating the vicinity of the mounting part 22 of the suspension arm 11 for vehicle and the collar 31 as the component 30 of the aspect in FIG. 2 as viewed from the front of the vehicle and a side view illustrating them as viewed from the behind of the vehicle, respectively.

As illustrated in FIG. 1, the suspension arm 11 for vehicle (hereinafter, it is also simply referred to as suspension arm 11) of the first embodiment is used as a lower arm which is a component member of a front suspension device to be provided in a vehicle such as an automobile. This suspension arm 11 is attached to a lower portion in front of the vehicle.

The suspension arm 11 includes an arm main body 20 (corresponding to a main body) forming a generally L-shape in a plan view. In the arm main body 20, a wheel supporting portion 21 is disposed at one end (left front side in FIG. 1). The wheel supporting portion 21 is swingably connected to a wheel supporting member (none of which is illustrated) via a ball joint. The arm main body 20 has a bent middle portion (on the back side in the center in FIG. 1) where a mounting part 22 for mounting the component 30 for vehicle suspension is disposed. The mounting part 22 functions as a first vehicle body connecting portion. The component 30 in the first embodiment is a metal-made cylindrical member, and is generally referred to as a collar 31. The collar 31 has a hollow cylindrical shape, and into which a resin-made bush (not illustrated) is press-fitted. The bush has its center through which a coupling pin (not illustrated) is inserted. The axes of the collar 31, of the bush, and of the coupling pin are, for example, along the front-back direction of the vehicle body. The collar 31 swingably couples the arm main body 20 with the vehicle body. In the arm main body 20, a second vehicle body connecting portion 23 is disposed at the other end (right hand side in FIG. 1), that is, at the rear-end in the vehicle front-back direction. The second vehicle body connecting portion 23 is swingably coupled with the vehicle body via a bush and a coupling pin (both not illustrated) whose axes are arranged in the up-down direction.

As illustrated in FIGS. 1, 2, 3, 4, 5A, 5B, 6, and 7, the suspension arm 11 is formed of at least a first plate 40 and a second plate 50 which are stamped products. The illustrated suspension arm 11 is formed of two plates (a first plate 40 and a second plate 50). The first plate 40 is also referred to as an upper plate, and the second plate 50 is also referred to as a lower plate. The first plate 40 and the second plate 50 each have a generally L-shape in a plan view. The suspension arm 11 includes: an arm main body 20 including at least a portion whose cross section has a rectangular shape (see FIG. 5A); and a mounting part 22 for mounting a component 30 for vehicle suspension.

As also illustrated in FIGS. 8, 9, 10, and 11, the first plate 40 includes: a first main body 41 included in the arm main body 20; a first flat plate part 42 extending in continuity with the main surface 41a of the first main body 41 and being bent with respect to the main surface 41a; and a first mounting surface 43 that is formed on the first flat plate part 42 and to abut on the outer surface of the collar 31. The first flat plate part 42 is bent from the main surface 41a of the first main body 41 toward the second plate 50.

Here, the wording "main surface 41a of the first main body 41" refers to a portion forming the main constituent of the first main body 41, and is included in an upper portion of the arm main body 20 illustrated on the upper side in FIG. 1. The "surface" in the term "main surface 41a" does not distinguish whether a front surface (the surface shown on the upper side in FIG. 1) or a back surface (the surface shown on the upper side in FIG. 2). The main surface 41a has a gentle uneven shape and secures rigidity of the first main body 41. The bent first flat plate part 42 and a flange portion 41b to be described later are included in a part of a side portion of the arm main body 20.

The first plate 40 includes, besides the first flat plate part 42, a flange portion 41b which is continuous with the main surface 41a of the first main body 41 and bent with respect to the main surface 41a. The first plate 40 is enhanced in its rigidity by forming the flange portion 41b. The flange portion 41b is also bent from the main surface 41a of the first main body 41 toward the second plate 50. Therefore, the cross-sectional shape of the first plate 40 has a cup shape (shape close to a U shape) opened downward. The first main body 41 has one end at which a wheel supporting portion 21 is formed by burring. The first main body 41 has the other end at which a second vehicle body connecting portion 23 is formed by burring.

The second plate 50 includes: a second main body 51, which is together with the first main body 41 of the first plate 40 included in the arm main body 20; a second flat plate part 52 extending in continuity with the main surface 51a of the second main body 51 and being bent with respect to the main surface 51a; and a second mounting surface 53 formed on the second flat plate part 52 and to abut on the outer surface of the collar 31. The second flat plate part 52 is bent from the main surface 51a of the second main body 51 toward the first plate 40.

Here, the wording "main surface 51a of the second main body 51" refers to a portion forming the main constituent of the second main body 51, and is included in the lower portion of the arm main body 20 illustrated on the upper side in FIG. 2. The "surface" in the term "main surface 51a" does not distinguish whether a front surface (the surface shown on the upper side in FIG. 2) or a back surface (the surface shown on the upper side in FIG. 1). The main surface 51a can have a gentle uneven shape. The bent second flat plate part 52 is included in a part of the side portion of the arm main body 20.

The second plate 50 has an almost flat shape except for the second flat plate part 52 and a portion in the vicinity thereof. The second plate 50 can be formed by bending a flange portion for enhancing rigidity with respect to the main surface 51a of the second main body 51 so as to be continuous with the main surface 51a in the same way as the flange portion 41b of the first plate 40. The second main body 51 is attached to first plate 40 so as to close a part of the lower opening of first plate 40 (see FIGS. 4 and 5A). The dimension from one end to the other end in the second main body 51 is formed smaller than the dimension from one end to the other end in the first main body 41. The second main body 51 exposes the wheel supporting portion 21 and the second vehicle body connecting portion 23 of the first main body 41.

Figure 14:
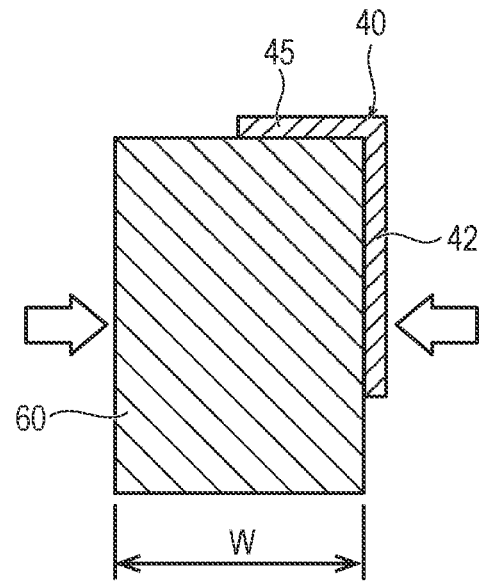
FIG. 14 is a cross-sectional view schematically illustrating a state where a first plate is set in a tooling die.

As illustrated in FIGS. 8, 9, and FIG. 14 to be described later, the first plate 40 is partially open toward the first flat plate part 42 so that the first mounting surface 43 can be formed by stamping in the state of a single body where the first flat plate part 42 is bent. Similarly, the second plate 50 is partially open toward the second flat plate part 52 so that the second mounting surface 53 can be formed by stamping in the state of a single body where the second flat plate part 52 is bent.

The arm main body 20 is configured by facing the first main body 41 of the first plate 40 and the second main body 51 of the second plate 50 each other.

The mounting part 22 is configured by facing the first flat plate part 42 of the first plate 40 and the second flat plate part 52 of the second plate 50 each other at a distance, and disposing the first mounting surface 43 and the second mounting surface 53 at a distance. The first plate 40 and the second plate 50 are combined by fillet welds 76 and 77 (see FIGS. 2, 3 and 5A). The reference numerals 76 and 77 of the fillet welds 76 and 77 represent weld beads.

The angle formed by the first flat plate part 42 and the main surface 41a of the first main body 41 is not particularly limited. As an example, as illustrated in FIG. 9, the first flat plate part 42 can be bent so as to form an L-shape with respect to the main surface 41a of the first main body 41. Here, the wording "being bent so as to form an L-shape" means that the cross-sectional shapes of the first flat plate part 42 and the main surface 41a are bent so as to have a generally L-shape as viewed in a cross section orthogonal to a bending line between the first flat plate part 42 and the first main body 41.

The angle formed by the second flat plate part 52 and the main surface 51a of the second main body 51 is also not particularly limited. As an example, as illustrated in FIG. 9, the second flat plate part 52 can be bent so as to form an L-shape with respect to the main surface 51a of the second main body 51. The wording "bent so as to form an L-shape" means that the cross-sectional shapes of the second flat plate part 52 and the main surface 51a are bent so as to have a generally L-shape as viewed in a cross section orthogonal to a bending line between the second flat plate part 52 and the second main body 51.

In the first embodiment, the first mounting surface 43 is formed from a first end face 44 formed at the end of the first flat plate part 42, and the second mounting surface 53 is formed from a second end face 54 formed at the end of the second flat plate part 52 (see FIGS. 8 and 9). The collar 31 is attached to the mounting part 22 by fillet welds 71 and 72 with the first end face 44 of the first flat plate part 42 and the second end face 54 of the second flat plate part 52, respectively (see FIGS. 6, 7, 8, 9, 10 and 11). The reference numerals 71 and 72 of the fillet welds 71 and 72 represent weld beads.

As illustrated in FIGS. 5B, 6, 7, 8, 9, 10, and 11, in the first embodiment, the first plate 40 further includes a first extension portion 45 that is continuous with the main surface 41a of the first main body 41 and extends toward the outside of the first main body 41 more than the first flat plate part 42. The second plate 50 further includes a second extension portion 55 that is continuous with the main surface 51a of the second main body 51 and extends toward the outside of the second main body 51 more than the second flat plate part 52. The first extension portion 45 and the second extension portion 55 can sandwich the collar 31 from a direction (up-down direction in FIGS. 10 and 11) intersecting a direction in which the first flat plate part 42 and the second flat plate part 52 face each other (a direction perpendicular to the plane of the page in FIGS. 10 and 11). The collar 31 is attached to the mounting part 22 by fillet welds 73, 74 with the end face of the first extension portion 45 and the end face of the second extension portion 55, respectively (see FIGS. 6, 7, 8, 9, 10 and 11). The reference numerals 73 and 74 of the fillet welds 73 and 74 represent weld beads.

As illustrated in FIGS. 5A, 6, 7, 8, 9, 10, and 11, the first plate 40 includes a third flat plate part 46 extending in continuity with the main surface 41a of the first main body 41 and being bent with respect to the main surface 41a. The second plate 50 includes a fourth flat plate part 56 that extends in continuity with the main surface 51a of the second main body 51 and bends with respect to the main surface 51a, and that is to overlap the third flat plate part 46 of the first plate 40. The third flat plate part 46 is located on the inner side of the first main body 41 more than the first mounting surface 43. The third flat plate part 46 has a curved shape in a plan view from a direction intersecting the main surface 41a of the first main body 41. The fourth flat plate part 56 is located on the inner side of the second main body 51 more than the second mounting surface 53. The fourth flat plate part 56 has a curved shape in a plan view from a direction intersecting the main surface 51a of the second main body 51. The end face 46a of the third flat plate part 46 is located on the inner side of the first main body 41 more than the first mounting surface 43 and the second mounting surface 53. Since the end face 46a of the third flat plate part 46 is located on the inner side of the first main body 41 more than the first mounting surface 43, it does not get in the way when stamping the first mounting surface 43 (see FIGS. 10 and 11). Since the end face 46a of the third flat plate part 46 is located on the inner side of the first main body 41 more than the second mounting surface 53, it does not get in the way when fillet welding 72 between the collar 31 and the second end face 54 (see FIG. 11). As illustrated in FIG. 5A, the height dimension h1 of the third flat plate part 46 and the height dimension h2 of the fourth flat plate part 56 are smaller than a dimension L in which first main body 41 of first plate 40 and second main body 51 of second plate 50 are spaced apart from each other.

The third flat plate part 46 and the fourth flat plate part 56, in which the curvature radius of the curved shape is a relatively small, are made by bending flange forming (drawing). The height dimension h1 of the third flat plate part 46 is made to be smaller than that of the first flat plate part 42, whereby the bending flange forming of the first plate 40 is facilitated, and the occurrence of defects such as cracks and wrinkles can be suppressed. Similarly, the height dimension h2 of the fourth flat plate part 56 is made to be smaller than the height dimension h2 of the second flat plate part 52, whereby the bending flange forming of the second plate 50 is facilitated, and the occurrence of defects such as cracking and wrinkles can be suppressed.

As illustrated in FIGS. 5A and 7, the third flat plate part 46 of the first plate 40 and the fourth flat plate part 56 of the second plate 50 are lap welded 76, whereby the generation of the oxide film can be suppressed. The reference numeral 76 of the lap weld 76 represents a weld bead.

As illustrated in FIG. 10, the ridgeline 81 from the end of the first end face 44 to the first extension portion 45 of the first plate 40 faces the outer surface of the collar 31 across the first gap 82. As illustrated in FIG. 11, the ridgeline 83 from the end of the second end face 54 to the second extension portion 55 of the second plate 50 faces the outer surface of the collar 31 across the second gap 84. The first gap 82 and the second gap 84 function as discharge holes for draining the coating liquid when coating the suspension arm 11, and the remaining of an excessive coating liquid can be prevented.

Figure 12:
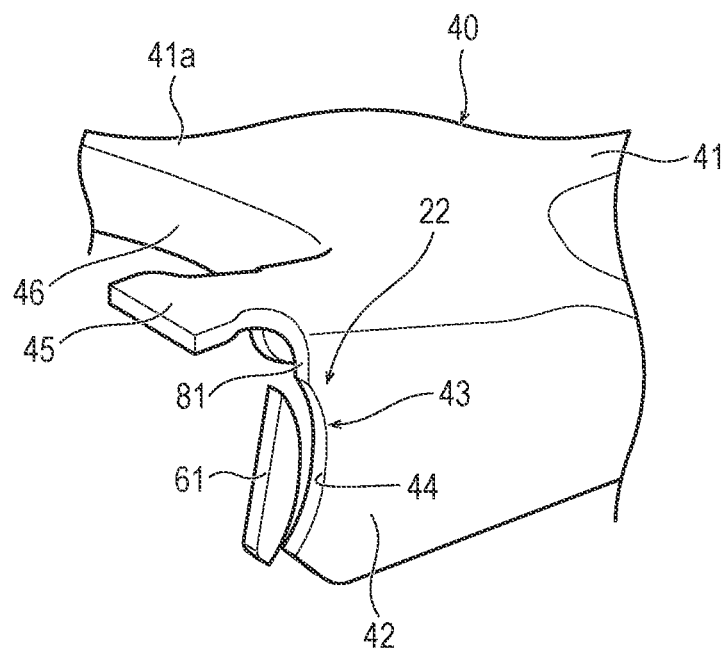
FIG. 12 is a perspective view schematically illustrating a state how a first mounting surface is formed on a first flat plate part of a first plate and illustrating a first extension portion.
Figure 13:
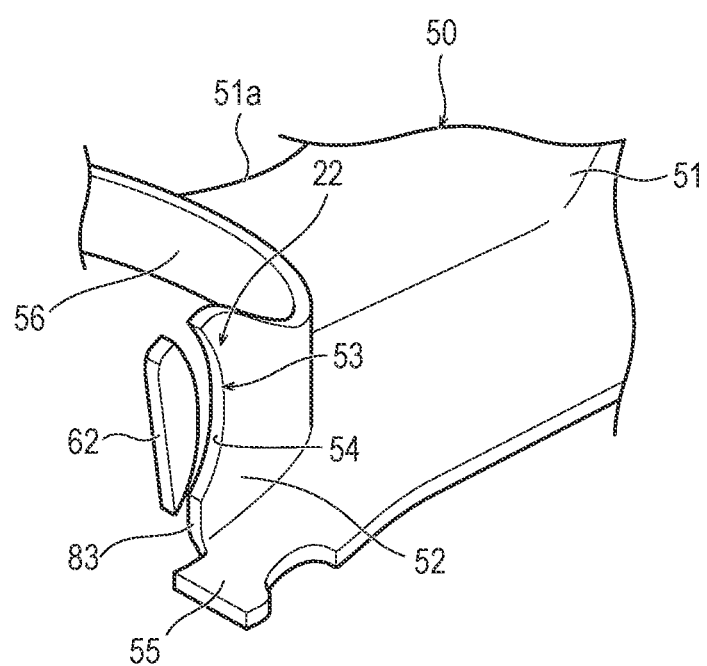
FIG. 13 is a perspective view schematically illustrating a state how a second mounting surface is formed on a second flat plate part of a second plate and illustrating a second extension portion.

FIG. 12 is a perspective view schematically illustrating a state how the first mounting surface 43 is formed on the first flat plate part 42 of the first plate 40 and illustrating the first extension portion 45, and FIG. 13 is a perspective view schematically illustrating a state how the second mounting surface 53 is formed on the second flat plate part 52 of the second plate 50 and illustrating the second extension portion 55. FIG. 14 is a cross-sectional view schematically illustrating a state where the first plate 40 is set in the tooling die 60.

As illustrated in FIG. 12, the first mounting surface 43 is formed by stamping the first plate 40 in the state of a single unit where the first flat plate part 42 is bent. The reference numeral 61 in FIG. 12 denotes an eliminated piece that has been stamped and eliminated from the first flat plate part 42. The press apparatus includes, for example, a cam driver and a cam slider. The first flat plate part 42 can be notched by cam type stamping to form the first mounting surface 43 of a concave arc shape corresponding to the shape of the outer peripheral surface of the collar 31.

As illustrated in FIG. 13, the second mounting surface 53 is formed by stamping the second plate 50 in the state of a single unit where the second flat plate part 52 is bent. The reference numeral 62 in FIG. 13 denotes an eliminated piece that has been stamped and eliminated from the first flat plate part 42. The second flat plate part 52 can be notched by cam type stamping to form the second mounting surface 53 of a concave arc shape corresponding to the shape of the outer peripheral surface of the collar 31.

As illustrated in FIG. 14, when forming the first mounting surface 43, the first plate 40 where the first flat plate part 42 is bent is made to abut on a tooling die 60 (corresponding to a die) and stamped. The width W of the tooling die 60 is formed to be a width capable of securing strength that can withstand a load at the time of stamping. A portion of the first plate 40 where the first flat plate part 42 and the first extension portion 45 are formed has an approximately L-shaped cross section, and is partially open toward the first flat plate part 42. The first plate 40 is positioned by making the first extension portion 45 to abut on the top surface of the tooling die 60 and making the first flat plate part 42 to abut on the side surface of the tooling die 60. The stamping is performed in this state, and a part of the first flat plate part 42 is eliminated and the first mounting surface 43 is formed.

Similarly, when forming the second mounting surface 53, the second plate 50 where the second flat plate part 52 is bent is made to abut on the tooling die 60 and stamped. A portion of the second plate 50 where the second flat plate part 52 and the second extension portion 55 are formed has an approximately L-shaped cross section, and is partially open toward the second flat plate part 52. The second plate 50 is positioned by making the second extension portion 55 to abut on the top surface of the tooling die 60 and making the second flat plate part 52 to abut on the side surface of the tooling die 60. The stamping is performed in this state, and a part of the second flat plate part 52 is eliminated and the second mounting surface 53 is formed.

The axial length of the collar 31 may be set relatively short due to restrictions such as a vehicle body layout. In such a case, the width of the first extension portion 45 sometimes becomes smaller than the width of the tooling die 60. Even in such a case, since the cross section of the portion to abut on the tooling die 60 has an approximately L-shape, the portions of the first flat plate part 42 and the first extension portion 45 can be made to abut on the tooling die 60, and the first mounting surface 43 can be formed without hindrance. Similarly, even when the width of the second extension portion 55 is smaller than the width of the tooling die 60, since the cross section of the portion to abut on the tooling die 60 has an approximately L-shape, the portions of the second flat plate part 52 and the second extension portion 55 can be made to abut on the tooling die 60, and the second mounting surface 53 can be formed without hindrance. Therefore, it is not necessary to form the first mounting surface 43 and the second mounting surface 53 by using a laser cutting apparatus or the like in place of stamping, and an increase in manufacturing cost can be suppressed.

A manufacturing procedure of the suspension arm 11 will be described.

The suspension arm 11 includes: an arm main body 20 forming an L-shape in a plan view; and a mounting part 22 which is disposed in a middle portion of the arm main body 20 and for mounting a collar 31 that swingably couples the arm main body 20 with a vehicle body. The suspension arm 11 is formed of a first plate 40 and a second plate 50, and includes an arm main body 20 including at least a portion whose cross section has a rectangular shape, and a mounting part 22 for mounting the collar 31.

First, on the first plate 40, there are formed the first main body 41 included in the arm main body 20 and the first flat plate part 42 extending in continuity with the main surface 41a of the first main body 41 and being bent with respect to the main surface 41a. The first plate 40 where the first flat plate part 42 is bent is made to abut on the tooling die 60 and stamped, whereby the first mounting surface 43 to abut on the outer surface of the collar 31 is formed on the first flat plate part 42.

Similarly, on the second plate 50, there are formed the second main body 51, which is together with the first main body 41 included in the arm main body 20, and the second flat plate part 52 extending in continuity with the main surface 51a of the second main body 51 and being bent with respect to the main surface 51a. The second plate 50 where the second flat plate part 52 is bent is made to abut on the die and stamped, whereby the second mounting surface 53 to abut on the outer surface of the collar 31 is formed on the second flat plate part 52.

Thereafter, the first main body 41 of the first plate 40 and the second main body 51 of the second plate 50 are brought into a state of facing each other. Furthermore, the first flat plate part 42 of the first plate 40 and the second flat plate part 52 of the second plate 50 are made to face each other at a distance, and the first mounting surface 43 and the second mounting surface 53 are brought into a state of being disposed at a distance. In this state, the first plate 40 and the second plate 50 are combined by welding joint to form the arm main body 20 and the mounting part 22.

As described above, the suspension arm 11 of the first embodiment is formed of the first plate 40 and the second plate 50 which are stamped products, and includes: the arm main body 20 including at least a portion whose cross section has a rectangular shape; and the mounting part 22 for mounting the component 30 (collar 31) for the vehicle suspension. The first plate 40 includes: a first main body 41 included in the arm main body 20; a first flat plate part 42 extending in continuity with the main surface 41*a* of the first main body 41 and being bent with respect to the main surface 41*a*; and a first mounting surface 43 formed on the first flat plate part 42 and to abut on the outer surface of the component 30 (collar 31). The second plate 50 includes: a second main body 51, which is together with the first main body 41 of the first plate 40 included in the arm main body 20; a second flat plate part 52 extending in continuity with the main surface 51*a* of the second main body 51 and being bent with respect to the main surface 51*a*; and a second mounting surface 53 formed on the second flat plate part 52 and to abut on the outer surface of the component 30 (collar 31). The first plate 40 is partially open toward the first flat plate part 42 so that the first mounting surface 43 can be formed by stamping in the state of a single unit where the first flat plate part 42 is bent. The second plate 50 is partially open toward the second flat plate part 52 so that the second mounting surface 53 can be formed by stamping in the state of a single unit where the second flat plate part 52 is bent. The arm main body 20 is configured by facing the first main body 41 of the first plate 40 and the second main body 51 of the second plate 50 each other. The mounting part 22 is configured by facing the first flat plate part 42 of the first plate 40 and the second flat plate part 52 of the second plate 50 each other at a distance, and disposing the first mounting surface 43 and the second mounting surface 53 at a distance.

According to the suspension arm 11 configured in this way, even in a case where the axial length of the component 30 (collar 31) is set to be relatively short due to restrictions such as a vehicle body layout, since the cross section of the portion including the first flat plate part 42 and the second flat plate part 52 has an approximately L-shape, the first plate 40 and the second plate 50 each are stamped in the state of a single unit, whereby the first mounting surface 43 and the second mounting surface 53 can be formed without hindrance. Therefore, it is not necessary to form the first mounting surface 43 and the second mounting surface 53 by using a laser cutting apparatus or the like in place of stamping, and an increase in manufacturing cost can be suppressed. Accordingly, even in a case where the axial length of the component 30 (collar 31) is short, there can be provided the suspension arm 11 in which the mounting part 22 for mounting the component 30 (collar 31) is formed by applying stamping advantageous in terms of cost.

The first flat plate part 42 is bent so as to form an L-shape with respect to the main surface 41*a* of the first main body 41, and the second flat plate part 52 is bent so as to form an L-shape with respect to the main surface 51*a* of the second main body 51. Since the bending is performed so as to form an L-shape, the stamping does not become complicated.

The first mounting surface 43 is formed from a first end face 44 formed at the end of the first flat plate part 42, and the second mounting surface 53 is formed from a second end face 54 formed at the end of the second flat plate part 52. The component 30 (collar 31) is attached to the mounting part 22 by fillet welds 71 and 72 with the first end face 44 of the first flat plate part 42 and the second end face 54 of the second flat plate part 52, respectively. By configuring in this way, the first mounting surface 43 and the second mounting surface 53 become surfaces facing outward, and the component 30 (collar 31) can be easily attached thereto by the fillet welds 71 and 72.

The first plate 40 further includes a first extension portion 45, and the second plate 50 further includes a second extension portion 55. The first extension portion 45 and the second extension portion 55 can sandwich the component 30 (collar 31) from a direction intersecting a direction in which the first flat plate part 42 and the second flat plate part 52 face each other. By configuring in this way, the component 30 (collar 31) can be attached to the mounting part 22 by fillet welds 73, 74 with the end face of the first extension portion 45 and the end face of the second extension portion 55, respectively, in addition to fillet welds 71, 72 with the first mounting surface 43 and the second mounting surface 53, respectively. As a result, the component 30 (collar 31) can be more strongly attached to the mounting part 22.

A ridgeline 81 from the end of the first end face 44 of the first plate 40 to the first extension portion 45 faces the outer surface of the component 30 (collar 31) across the first gap 82, and a ridgeline 83 from the end of the second end face 54 of the second plate 50 to the second extension portion 55 faces the outer surface of the component 30 (collar 31) across the second gap 84. By configuring in this way, when coating the suspension arm 11, since the first gap 82 and the second gap 84 function as discharge holes for draining the coating liquid, the remaining of an excessive coating liquid can be prevented.

The component 30 is a metal-made cylindrical member (collar 31). By configuring in this way, the metal-made collar 31 can be attached to the mounting part 22 by fillet welds 71 and 72 with the first mounting surface 43 and the second mounting surface 53, respectively. Furthermore, the metal-made collar 31 can be attached to the mounting part 22 by fillet welds 73, 74 with the end face of the first extension portion 45 and the end face of the second extension portion 55, respectively.

The first plate 40 includes a third flat plate part 46, and the second plate 50 includes a fourth flat plate part 56. The third flat plate part 46 is located on the inner side of the first main body 41 than the first mounting surface 43, and has a curved shape in a plan view from a direction intersecting the main surface 41*a* of the first main body 41. The fourth flat plate part 56 is located on the inner side of the second main body 51 than the second mounting surface 53, and has a curved shape in a plan view from a direction intersecting the main surface 51*a* of the second main body 51. A height dimension h1 of the third flat plate part 46 and a height dimension h2 of the fourth flat plate part 56 are smaller than a dimension L in which the first main body 41 of the first plate 40 and the second main body 51 of the second plate 50 are spaced apart from each other. By configuring in this way, even in a case where the curvature radius of the curved shape of each of the third flat plate part 46 and the fourth flat plate part 56 is relatively small and is formed by bending flange forming, the bending flange forming of the first plate 40 and the second plate 50 is facilitated, and the occurrence of defects such as cracks and wrinkles can be suppressed.

The suspension arm 11 manufactured by the manufacturing method of the first embodiment includes: an arm main body 20 that is formed of a first plate 40 and a second plate 50 which are stamped products, and includes at least a portion whose cross section has a rectangular shape; and a mounting part 22 for mounting a component 30 (collar 31)

for vehicle suspension. In order to manufacture the suspension arm 11, first, the first main body 41 and the first flat plate part 42 are formed on the first plate 40. The first plate 40 where the first flat plate part 42 is bent is made to abut on the tooling die 60 and stamped thereby forming the first mounting surface 43. Similarly, a second main body 51 and a second flat plate part 52 are formed on a second plate 50. The second plate 50 where the second flat plate part 52 is bent is made to abut on the tooling die 60 and stamped thereby forming the second mounting surface 53. Thereafter, the first main body 41 of the first plate 40 and the second main body 51 of the second plate 50 are brought into a state of facing each other. Furthermore, the first flat plate part 42 of the first plate 40 and the second flat plate part 52 of the second plate 50 are made to face each other at a distance, and the first mounting surface 43 and the second mounting surface 53 are brought into a state of being disposed at a distance. In this state, the first plate 40 and the second plate 50 are combined by welding joint to form the arm main body 20 and the mounting part 22.

According to the manufacturing method configured in this way, even in a case where the axial length of the component 30 (collar 31) is short, there can be provided the suspension arm 11 in which the mounting part 22 for mounting the component 30 (collar 31) is formed by applying stamping advantageous in terms of cost.

The first flat plate part 42 is bent so as to form an L-shape with respect to the main surface 41a of the first main body 41, and the second flat plate part 52 is bent so as to form an L-shape with respect to the main surface 51a of the second main body 51. Since the bending is performed so as to form an L-shape, the stamping does not become complicated.

Second Embodiment

Figure 15:
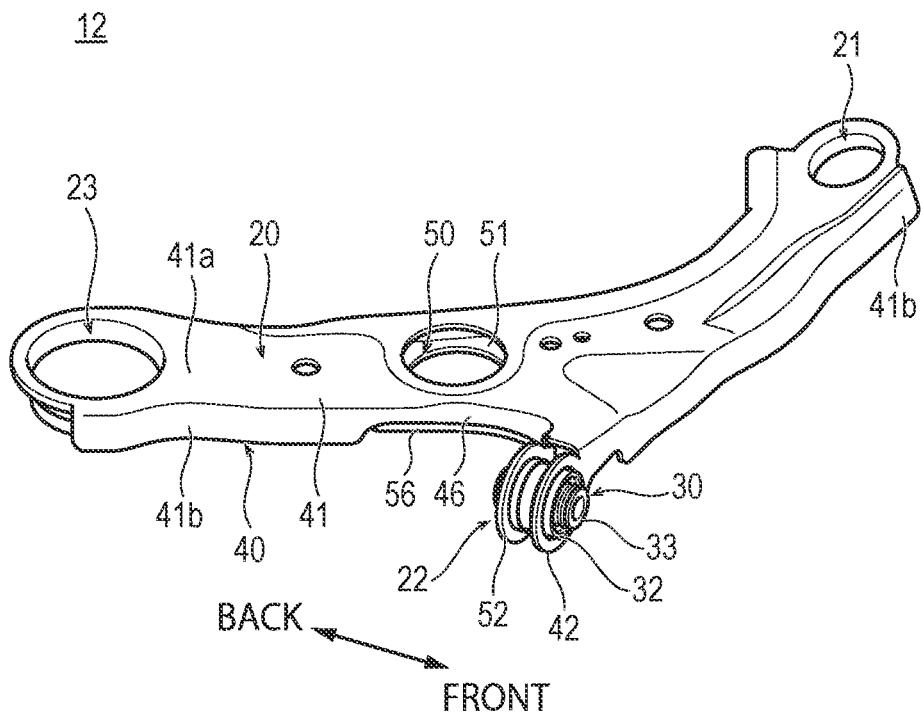
FIG. 15 is a perspective view illustrating a suspension arm for vehicle of a second embodiment.
Figure 16:
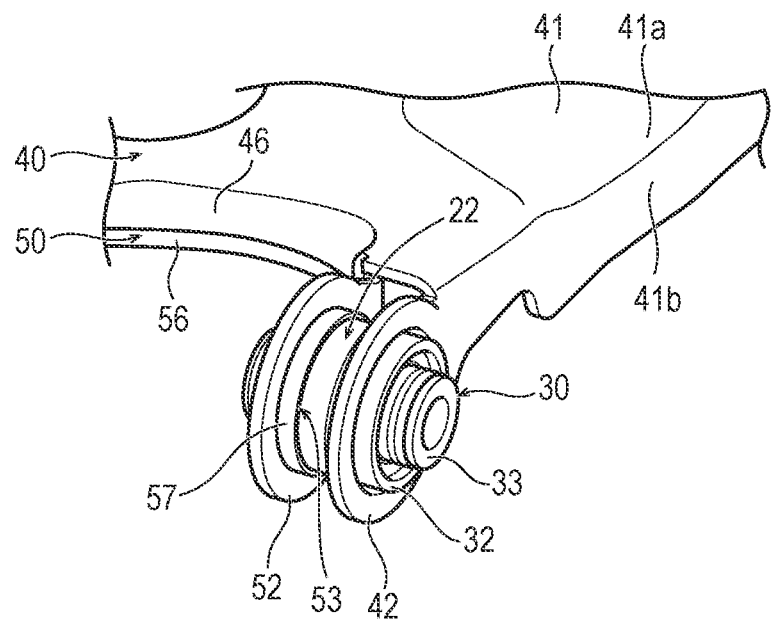
FIG. 16 is a perspective view illustrating the vicinity of a mounting part of a suspension arm for vehicle and a bush as a component as viewed from the front of the vehicle.
Figure 17:
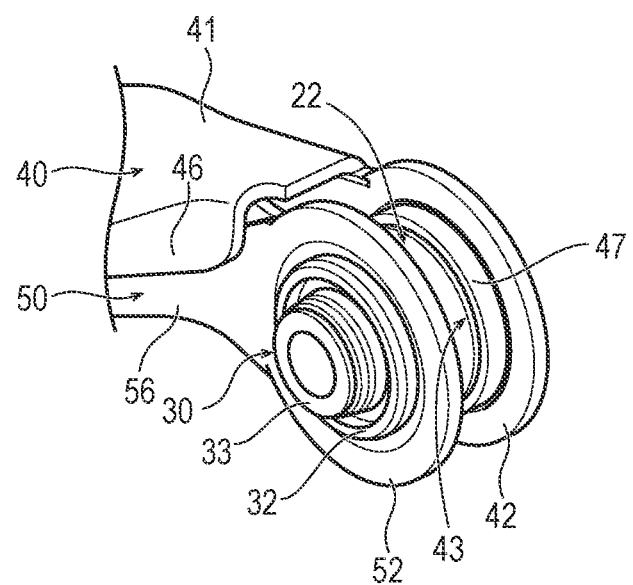
FIG. 17 is a perspective view illustrating the vicinity of a mounting part of a suspension arm for vehicle and a bush as a component as viewed from the behind of the vehicle.
Figure 18:
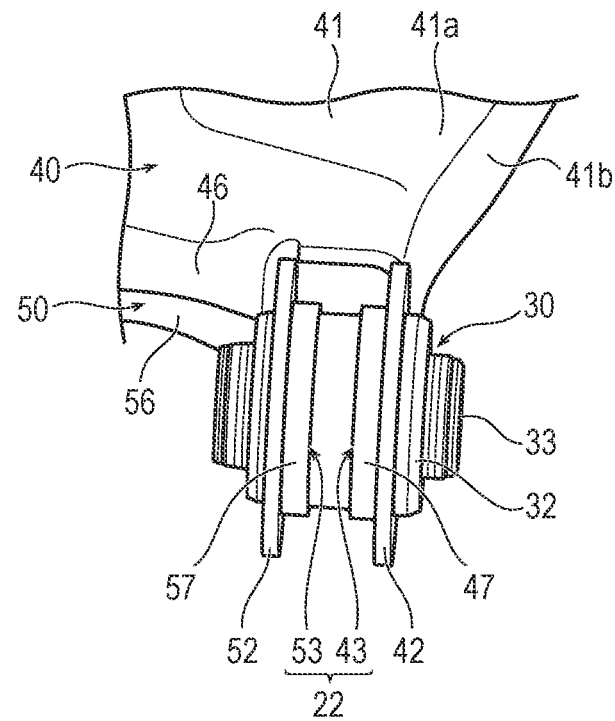
FIG. 18 is a perspective view illustrating the vicinity of a mounting part of a suspension arm for vehicle and a bush as a component as viewed from a direction parallel to the first flat plate part and the second flat plate part.
Figure 19:
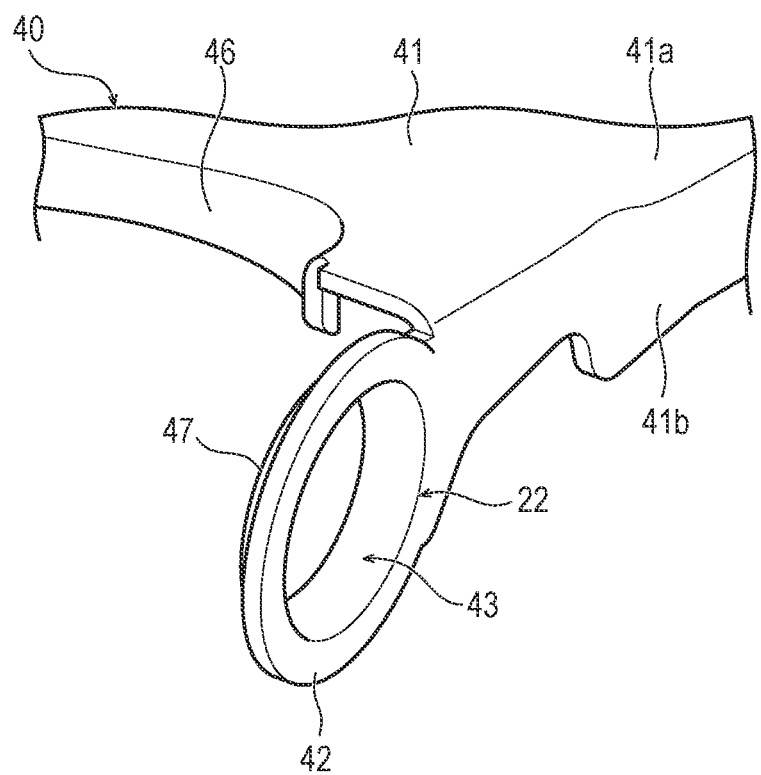
FIG. 19 is a perspective view illustrating the vicinity of a mounting part of a first plate as viewed from the front of the vehicle.
Figure 20:
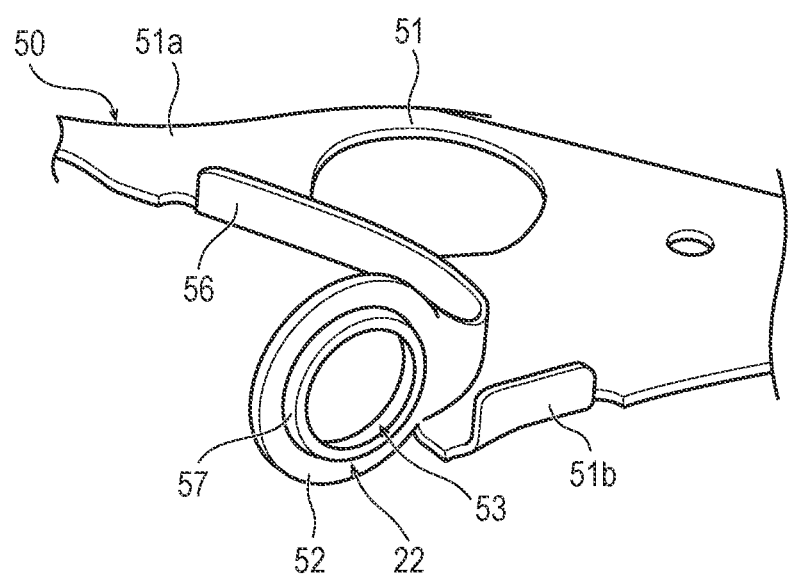
FIG. 20 is a perspective view illustrating the vicinity of a mounting part of a second plate as viewed from the front of the vehicle.

A suspension arm 12 for vehicle of a second embodiment will be described with reference to FIGS. 15 to 20. FIG. 15 is a perspective view illustrating a suspension arm 12 for vehicle of the second embodiment. FIGS. 16 and 17 are a perspective view illustrating the vicinity of the mounting part 22 of the suspension arm 12 for vehicle and a bush 32 as a component 30 as viewed from the front of the vehicle and a perspective view illustrating them as viewed from the front of the vehicle, respectively. FIG. 18 is a perspective view illustrating the vicinity of the mounting part 22 of the suspension arm 12 for vehicle and the bush 32 as the component 30 as viewed from a direction parallel to the first flat plate part 42 and the second flat plate part 52. FIGS. 19 and 20 are perspective views illustrating the vicinity of the mounting part 22 of the first plate 40 and of the second plate 50 as viewed from the front of the vehicle, respectively. Note that members common to those of the first embodiment are denoted by the same reference numerals, and description thereof will be partially omitted. The reference numeral 51b in FIG. 20, as with the flange portion 41b of the first plate 40, denotes a flange portion continuously to the main surface 51a of the second main body 51 and formed by bending with respect to the main surface 51a.

The suspension arm 12 for vehicle of the second embodiment is different in that the first mounting surface 43 and the second mounting surface 53 are formed from the inner surfaces of the cylindrical supporting portions 47 and 57 processed by burring, from that of the first embodiment in which the first mounting surface 43 and the second mounting surface 53 are formed from the end faces 44 and 54 of the flat plate parts 42 and 52. Moreover, it is also different from that of the first embodiment in terms of the configuration of the component 30.

The suspension arm 12 includes an arm main body 20 forming a generally L-shape in a plan view. The arm main body 20 has a bent middle portion (on the center front side in FIG. 15) at which a mounting part 22 for mounting the component 30 is disposed. The component 30 in the second embodiment is a resin-made cylindrical member and is generally referred to as a bush 32. The resin-made bush 32 has its center through which a coupling pin 33 is inserted. The axes of the bush 32 and of the coupling pin 33 are, for example, along the front-back direction of the vehicle body. The bush 32 swingably couples the arm main body 20 with the vehicle body.

As illustrated in FIGS. 15, 16, 17, 18, 19, and 20, the suspension arm 12 of the second embodiment, as in the first embodiment, is formed of a first plate 40 and a second plate 50 which are stamped products. The first plate 40 and the second plate 50 each have a generally L-shape in a plan view. The suspension arm 11 includes: an arm main body 20 including at least a portion whose cross section has a rectangular shape; and a mounting part 22 for mounting a component 30 (bush 32) for vehicle suspension.

The first plate 40 includes: a first main body 41 included in the arm main body 20; a first flat plate part 42 extending in continuity with the main surface 41a of the first main body 41 and being bent with respect to the main surface 41a; and a first mounting surface 43 formed on the first flat plate part 42 and to abut on the outer surface of the bush 32.

The second plate 50 includes: a second main body 51, which is together with the first main body 41 of the first plate 40 included in the arm main body 20; a second flat plate part 52 extending in continuity with the main surface 51a of the second main body 51 and being bent with respect to the main surface 51a; and a second mounting surface 53 formed on the second flat plate part 52 and to abut on the outer surface of the bush 32.

As illustrated in FIGS. 19 and 20, the first plate 40 is partially open toward the first flat plate part 42 so that the first mounting surface 43 can be formed by stamping in the state of a single unit where the first flat plate part 42 is bent. Similarly, the second plate 50 is partially open toward the second flat plate part 52 so that the second mounting surface 53 can be formed by stamping in the state of a single body where the second flat plate part 52 is bent.

The arm main body 20 is configured by facing the first main body 41 of the first plate 40 and the second main body 51 of the second plate 50 each other.

As illustrated in FIGS. 15, 16, 17, and 18, the mounting part 22 is configured by facing the first flat plate part 42 of the first plate 40 and the second flat plate part 52 of the second plate 50 each other at a distance, and disposing the first mounting surface 43 and the second mounting surface 53 at a distance. The first plate 40 and the second plate 50 are combined by fillet welding as in the first embodiment.

The angle formed by the first flat plate part 42 and the main surface 41a of the first main body 41 is not particularly limited. As an example, the first flat plate part 42 can be bent so as to form an L-shape with respect to the main surface 41a of the first main body 41. The angle formed by the second flat plate part 52 and the main surface 51a of the second main body 51 is also not particularly limited. As an example, the second flat plate part 52 can be bent so as to form an L-shape with respect to the main surface 51a of the second main body 51.

In the second embodiment, the first mounting surface 43 is formed from the inner surface of the first cylindrical supporting portion 47 processed by burring on the first flat plate part 42, and the second mounting surface 53 is formed from the inner surface of the second cylindrical supporting portion 57 processed by burring on the second flat plate part 52 (see FIGS. 19 and 20). The bush 32 is press-fitted into the first cylindrical supporting portion 47 of the first flat plate part 42 and the second cylindrical supporting portion 57 of the second flat plate part 52 thereby being attached to the mounting part 22 (see FIGS. 16, 17 and 18).

The height of the first cylindrical supporting portion 47 (the width of the first mounting surface 43) and the height of the second cylindrical supporting portion 57 (the width of the second mounting surface 53) are not particularly limited, and are determined to an appropriate dimension according to the length in the axial direction of the bush 32 to be press-fitted.

As illustrated in FIG. 14, when forming the first mounting surface 43, the first plate 40 in which the first flat plate part 42 is bent is made to abut on the tooling die 60 and stamped. The width W of the tooling die 60 is formed to be a width capable of securing strength that can withstand a load at the time of stamping. The width W of the tooling die 60 is further formed into a width that can incorporate a shooter or the like that discharges scraps cut by burring process. A portion of the first plate 40 from the first main body 41 to the first flat plate part 42 has an approximately L-shaped cross section, and is partially open toward the first flat plate part 42. The first plate 40 is positioned by making the first main body 41 to abut on the top surface of the tooling die 60 and making the first flat plate part 42 to abut on the side surface of the tooling die 60. The stamping is performed in this state to form the first cylindrical supporting portion 47 processed by burring.

Similarly, when forming the second mounting surface 53, the second plate 50 where the second flat plate part 52 is bent is made to abut on the tooling die 60 and stamped. A portion of the second plate 50 from the second main body 51 to the second flat plate part 52 has an approximately L-shaped cross section, and is partially open toward the second flat plate part 52. The second plate 50 is positioned by making the second main body 51 to abut on the top surface of the tooling die 60 and making the second flat plate part 52 to abut on the side surface of the tooling die 60. The stamping is performed in this state to form the second cylindrical supporting portion 57 processed by burring.

The axial length of the bush 32 may be set relatively short due to restrictions such as a vehicle body layout. Even in such a case, since the cross section of the portion to abut on the tooling die 60 has an approximately L-shape, the portion of the first flat plate part 42 can be made to abut on the tooling die 60, and the first mounting surface 43 (the inner surface of the first cylindrical supporting portion 47) can be formed without hindrance. Similarly, since the cross section of the portion to abut on the tooling die 60 has an approximately L-shape, the portion of the second flat plate part 52 can be made to abut on the tooling die 60, and the second mounting surface 53 (the inner surface of the second cylindrical supporting portion 57) can be formed without hindrance. Therefore, it is not necessary to form the first mounting surface 43 and the second mounting surface 53 by using a laser cutting apparatus or the like in place of stamping, and an increase in manufacturing cost can be suppressed.

The procedure of manufacturing the suspension arm 12 of the second embodiment is similar to that of the first embodiment.

First, on the first plate 40, there are formed the first main body 41 included in the arm main body 20 and the first flat plate part 42 extending in continuity with the main surface 41a of the first main body 41 and being bent with respect to the main surface 41a. The first plate 40 where the first flat plate part 42 is bent is made to abut on the tooling die 60 and stamped, whereby the first mounting surface 43 (the inner surface of the first cylindrical supporting portion 47) to abut on the outer surface of the bush 32 is formed on the first flat plate part 42.

Similarly, on the second plate 50, there are formed the second main body 51, which is together with the first main body 41 included in the arm main body 20, and the second flat plate part 52 extending in continuity with the main surface 51a of the second main body 51 and being bent with respect to the main surface 51a. The second plate 50 where the second flat plate part 52 is bent is made to abut on the die and stamped, whereby the second mounting surface 53 (the inner surface of the second cylindrical supporting portion 57) to abut on the outer surface of the bush 32 is formed on the second flat plate part 52.

Thereafter, the first main body 41 of the first plate 40 and the second main body 51 of the second plate 50 are brought into a state of facing each other. Furthermore, the first flat plate part 42 of the first plate 40 and the second flat plate part 52 of the second plate 50 are made to face each other at a distance, and the first mounting surface 43 and the second mounting surface 53 are brought into a state of being disposed at a distance. In this state, the first plate 40 and the second plate 50 are combined by welding joint to form the arm main body 20 and the mounting part 22.

As described above, the suspension arm 12 of the second embodiment includes: the arm main body 20 that is formed of the first plate 40 and the second plate 50 which are stamped products, and that includes at least a portion whose cross section has a rectangular shape; and the mounting part 22 for mounting the component 30 (bush 32) for the vehicle suspension. The first plate 40 includes: a first main body 41 included in the arm main body 20; a first flat plate part 42 extending in continuity with the main surface 41a of the first main body 41 and being bent with respect to the main surface 41a; and a first mounting surface 43 formed on the first flat plate part 42 and to abut on the outer surface of the component 30 (bush 32). The second plate 50 includes: a second main body 51, which is together with the first main body 41 of the first plate 40 included in the arm main body 20; a second flat plate part 52 extending in continuity with the main surface 51a of the second main body 51 and being bent with respect to the main surface 51a; and a second mounting surface 53 formed on the second flat plate part 52 and to abut on the outer surface of the component 30 (bush 32). The first plate 40 is partially open toward the first flat plate part 42 so that the first mounting surface 43 can be formed by stamping in the state of a single unit where the first flat plate part 42 is bent. The second plate 50 is partially open toward the second flat plate part 52 so that the second mounting surface 53 can be formed by stamping in the state of a single unit where the second flat plate part 52 is bent. The arm main body 20 is configured by facing the first main body 41 of the first plate 40 and the second main body 51 of the second plate 50 each other. The mounting part 22 is configured by facing the first flat plate part 42 of the first plate 40 and the second flat plate part 52 of the second plate 50 each other at a distance, and disposing the first mounting surface 43 and the second mounting surface 53 at a distance.

According to the suspension arm 12 configured in this way, even in a case where the axial length of the component 30 (bush 32) is set to be relatively short due to restrictions such as a vehicle body layout, since the cross section of the portion including the first flat plate part 42 and the second flat plate part 52 has an approximately L-shape, the first plate 40 and the second plate 50 each are stamped in the state of a single unit, whereby the first mounting surface 43 and the second mounting surface 53 can be formed without hindrance. Therefore, it is not necessary to form the first mounting surface 43 and the second mounting surface 53 by using a laser cutting apparatus or the like in place of stamping, and an increase in manufacturing cost can be suppressed. Therefore, even in a case where the axial length of the component 30 (bush 32) is short, there can be provided the suspension arm 12 in which the mounting part 22 for mounting the component 30 (bush 32) is formed by applying stamping advantageous in terms of cost.

The first mounting surface 43 is formed from the inner surface of the first cylindrical supporting portion 47 processed by burring on the first flat plate part 42, and the second mounting surface 53 is formed from the inner surface of the second cylindrical supporting portion 57 processed by burring on the second flat plate part 52. The component 30 (bush 32) is press-fitted into the first cylindrical supporting portion 47 of the first flat plate part 42 and the second cylindrical supporting portion 57 of the second flat plate part 52 thereby being attached to the mounting part 22. By configuring in this way, the first mounting surface 43 and the second mounting surface 53 each become a cylindrical flange surface, and the component 30 (bush 32) can be easily attached thereto by press-fitting.

The component 30 is a resin-made cylindrical member (bush 32). By configuring in this way, the resin-made bush 32 can be press-fitted into each of the first mounting surface 43 (the inner surface of the first cylindrical supporting portion 47) and the second mounting surface 53 (the inner surface of the second cylindrical supporting portion 57) and attached to the mounting part 22.

According to the method of manufacturing the suspension arm 12 of the second embodiment, as with the first embodiment, even in a case where the axial length of the component 30 (bush 32) is short, there can be provided the suspension arm 12 in which the mounting part 22 for mounting the component 30 (bush 32) is formed by applying stamping advantageous in terms of cost.

Modified Example

The present invention is not limited to the above-described embodiments, and can be appropriately modified. For example, there has been shown a suspension arm 12 for vehicle which is formed of two plates (the first plate 40 and the second plate 50), but the suspension arm for vehicle can be formed of three or more plates.

Furthermore, in the second embodiment, there has been explained the embodiment where the resin-made cylindrical member (bush 32) is press-fitted. However, a metal-made cylindrical member (collar 31) can be attached to the mounting part 22 by press-fitting or fillet welding. The resin-made bush 32 is housed inside the collar 31.

In the first and second embodiments, the suspension structure for vehicle according to the present invention is applied to the suspension arm for vehicle, but the present invention is not limited to this case. The suspension structure for vehicle according to the present invention can be applied to a suspension member for vehicle as long as the suspension structure for vehicle includes: a main body that is formed of at least a first plate and a second plate which are stamped products and includes at least a portion whose cross section has a rectangular shape; and a mounting part for mounting a component for vehicle suspension.

REFERENCE SIGNS LIST 11, 12 Suspension arm (Suspension structure for vehicle, Suspension arm for vehicle)
20 Arm main body (Main body)
21 Wheel supporting portion
22 Mounting part
23 Second vehicle body connecting portion
30 Component for vehicle suspension
31 Metal-made cylindrical member (collar)
32 Resin-made cylindrical member (bush)
33 Coupling pin
40 First plate
41 First main body
41a Main surface of first main body
41b Flange portion
42 First flat plate part
43 First mounting surface
44 First end face
45 First extension portion
46 Third flat plate part
46a End face
47 First cylindrical supporting portion
50 Second plate
51 Second main body
51a Main surface of second main body
51b Flange portion
52 Second flat plate part
53 Second mounting surface
54 Second end face
55 Second extension portion
56 Fourth flat plate part
57 Second cylindrical supporting portion
60 Tooling die
61, 62 Eliminated piece
71, 72, 73, 74, 76, 77 Fillet weld
81, 83 Ridgeline
82 First gap
84 Second gap
h1 Height dimension of third flat plate part
h2 Height dimension of fourth flat plate part
L Dimension in which first main body and second main body are spaced apart from each other

The invention claimed is:

1. A suspension structure for vehicle comprising: a main body that is formed of at least a first plate and a second plate which are stamped products and that includes at least a portion whose cross section has a rectangular shape; and a mounting part for mounting a component for vehicle suspension,
wherein the first plate includes: a first main body included in the main body; a first flat plate part extending in continuity with a main surface of the first main body and being bent so as to form an L-shape with respect to the main surface; and a first mounting surface formed on the first flat plate part at a first mounting end portion of the first plate and to abut on an outer surface of the component, the second plate includes: a second main body, which is together with the first main body of the first plate included in the main body; a second flat plate part extending in continuity with a main surface of the second main body and being bent so as to form an L-shape with respect to the main surface; and a second mounting surface formed on the second flat plate part at a second mounting end portion of the second plate and to abut on the outer surface of the component, the first plate is partially open toward the first flat plate part so that the first mounting surface can be formed by stamping in a state of a single body in which the first flat plate part is bent, and a cross-section of the first plate at the first mounting end portion is L-shaped, the second plate is partially open toward the second flat plate part so that the second mounting surface can be formed by stamping in a state of a single body in which the second flat plate part is bent, and a cross-section of the second plate at the second mounting end portion is L-shaped, the main body is configured by facing the first main body of the first plate and the second main body of the second plate each other, and the mounting part is configured by, at the first and second mounting end portions, facing the first flat plate part of the first plate and the second flat plate part of the second plate each other at a distance, and disposing the first mounting surface and the second mounting surface at a distance.

2. The suspension structure for vehicle according to claim 1, wherein the first mounting surface is formed from a first end face formed at an end of the first mounting end portion, the second mounting surface is formed from a second end face formed at an end of the second mounting end portion, and the component is attached to the mounting part by fillet welding with each of the first end face of the first flat plate part and the second end face of the second flat plate part.

3. The suspension structure for vehicle according to claim 2, wherein the first plate further includes a first extension portion that is continuous with the main surface of the first main body and extends toward outside of the first main body more than the first flat plate part, the second plate further includes a second extension portion that is continuous with the main surface of the second main body and extends toward outside of the second main body more than the second flat plate part, and the first extension portion and the second extension portion can sandwich the component from a direction intersecting a direction in which the first flat plate part and the second flat plate part face each other.

4. The suspension structure for vehicle according to claim 3, wherein a ridgeline from an end of the first end face to the first extension portion of the first plate faces the outer surface of the component across a first gap, and a ridgeline from an end of the second end face to the second extension portion of the second plate faces the outer surface of the component across a second gap.

5. The suspension structure for vehicle according to claim 2, wherein the component is a metal-made cylindrical member.

6. The suspension structure for vehicle according to claim 1, wherein the first mounting surface is formed from an inner surface of a first cylindrical supporting portion processed by burring on the first flat plate part, the second mounting surface is formed from an inner surface of a second cylindrical supporting portion processed by burring on the second flat plate part, and the component is press-fitted into the first cylindrical supporting portion of the first flat plate part and the second cylindrical supporting portion of the second flat plate part thereby being attached to the mounting part.

7. The suspension structure for vehicle according to claim 6, wherein the component is a resin-made or metal-made cylindrical member.

8. The suspension structure for vehicle according to claim 1, wherein the first plate includes a third flat plate part extending in continuity with the main surface of the first main body and being bent with respect to the main surface, the second plate includes a fourth flat plate part extending in continuity with the main surface of the second main body and being bent with respect to the main surface so as to be overlapped with the third flat plate part of the first plate, the third flat plate part is located on inside of the first main body more than the first mounting surface, and has a curved shape in a plan view from a direction intersecting the main surface of the first main body, the fourth flat plate part is located on inside of the second main body more than the second mounting surface, and has a curved shape in a plan view from a direction intersecting the main surface of the second main body, and a height dimension of the third flat plate part and a height dimension of the fourth flat plate part each are smaller than a dimension in which the first main body of the first plate and the second main body of the second plate are spaced apart from each other.

9. The suspension structure for vehicle according to claim 1, wherein the suspension structure for vehicle is applied to a suspension arm for vehicle.

10. A method of manufacturing a suspension structure for vehicle including: a main body that is formed of at least a first plate and a second plate which are stamped products and that includes at least a portion whose cross section has a rectangular shape; and a mounting part for mounting a component for vehicle suspension, comprising:

forming, on the first plate, a first main body included in the main body and a first flat plate part extending in continuity with a main surface of the first main body and being bent so as to form an L-shape with respect to the main surface;

forming a first mounting surface to abut on an outer surface of the component on the first flat plate part at a first mounting end portion of the first plate by making the first plate where the first flat plate part is bent to abut on a die and stamped, wherein a cross-section of the first plate at the first mounting end portion is L-shaped;

forming, on the second plate, a second main body, which is together with the first main body of the first plate included in the main body, and a second flat plate part extending in continuity with a main surface of the second main body and being bent so as to form an L-shape with respect to the main surface;

forming a second mounting surface to abut on the outer surface of the component on the second flat plate part at a second mounting end portion of the second plate by making the second plate where the second flat plate part is bent to abut on the die and stamped, wherein a cross-section of the second plate at the second mounting end portion is L-shaped; and making the first main body of the first plate and the second main body of the second plate in a state of facing each other, and furthermore making the first flat plate part of the first plate and the second flat plate part of the second plate to face each other at a distance, and in a state in which the first mounting surface and the second mounting surface at the first and second mounting end portions are disposed at a distance, the first plate and the second plate are combined by welding joint to form the main body and the mounting part.

11. The method of manufacturing a suspension structure for vehicle according to claim 10, wherein the suspension structure for vehicle is applied to a suspension arm for vehicle.

\* \* \* \* \*